United States Patent Office 3,482,022
Patented Dec. 2, 1969

3,482,022
ANTHELMINTIC 2-IMIDAZOLIN-2-YL-BENZIMIDAZOLES
George Holan, Brighton, Victoria, and Eva Lea Samuel, East Bentleigh, Victoria, Australia, assignors to Monsanto Chemicals (Australia) Limited, Westscray, Victoria, Australia, a company of Victoria, Australia
No Drawing. Original application Apr. 15, 1965, Ser. No. 448,271, now Patent No. 3,365,462, dated Jan. 23, 1968. Divided and this application Sept. 28, 1967, Ser. No. 680,604
Int. Cl. A01n 9/22
U.S. Cl. 424—273  2 Claims

ABSTRACT OF THE DISCLOSURE

A method of treating helminthiasis by administering to animals a therapeutic amount of a compound of the formula:

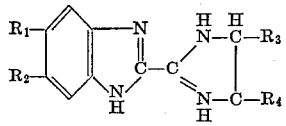

wherein $R_1$ and $R_2$ are each selected from the class consisting of hydrogen, chlorine, bromine, alkyl of not more than 5 carbon atoms, and alkoxy of not more than 5 carbon atoms; and wherein $R_3$ and $R_4$ are each selected from the class consisting of hydrogen and alkyl of not more than 5 carbon atoms; or a composition containing said compound.

---

This application is a division of copending application Ser. No. 448,271, filed Apr. 15, 1965, now U.S. Patent 3,365,462.

This invention provides new 2-substituted benzimidazoles, in particular, 2-imidazolin-2-yl-benzimidazoles, which have been shown to be useful as biological toxicants especially as anthelmintics.

The new compounds of the invention are the 2-imidazolin-2-yl-benzimidazoles having the structural formula:

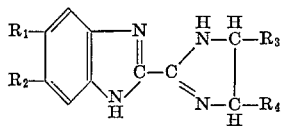

and the salts and N-acyl derivatives of such compounds, wherein $R_1$ and $R_2$ denote hydrogen or substituent groups selected from halogen, alkyl radicals containing not more than five carbon atoms, or alkoxy radicals in which the alkyl portion contains not more than five carbon atoms; and wherein $R_3$ and $R_4$ denote hydrogen or alkyl radicals containing not more than five carbon atoms. The halogen preferably is chlorine or bromine, while the alkyl radical preferably is methyl, and the alkoxy preferably is methoxy. The N-acyl derivatives preferably are the N-acetyl or N-benzoyl derivative, which convert by hydrolysis to the parent base of the above formula. The salts are preferably the acid-addition salts, such as the hydrochloride, sulphate, and nitrate, provided by mineral acids; or such as the acetate, glycolate, and stearate, provided by aliphatic carboxylic acids; or such as the phthalate, p-aminobenzoate, and salicylate, provided by aromatic carboxylic acids. Certain of these salts, such as the hydrochloride and acetate, are more soluble in water than the parent base, hence they are more suitable for some applications. When applied as anthelmintics it is, of course, essential that the acid moiety of the present compounds be non-toxic, and for this purpose the salts with aromatic carboxylic acids are particularly preferred.

Compounds in accordance with the invention can be prepared from the corresponding 2-imidazoline carboxylic acid or from the corresponding 2-imidazoline aldehyde, as illustrated in the following equations:

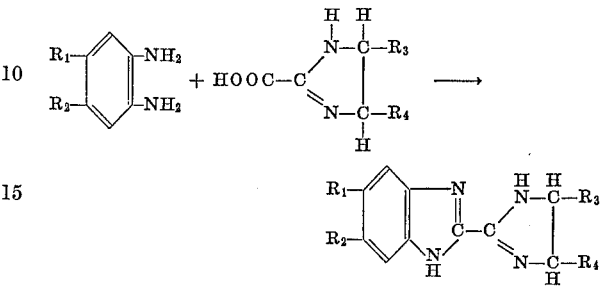

and

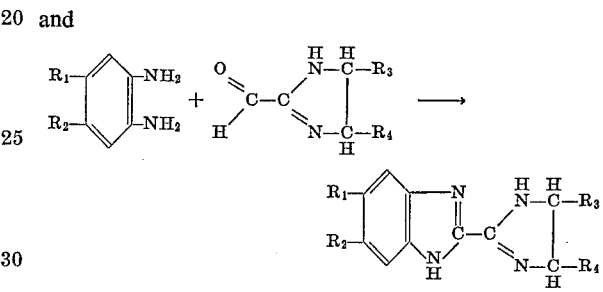

wherein $R_1$, $R_2$, $R_3$ and $R_4$ are as denoted above, by conventional procedure for benzazole synthesis.

Thus, the compounds of the invention may be prepared by reacting together an imidazolin-2-yl-2-carboxylic acid and an o-phenylene diamine in the presence of polyphosphoric acid at about 250° C. In order to avoid undue loss of the imidazoline carboxylic acid component by decarboxylation, it is often preferable to start with a lower alkyl ester of the carboxylic acid, however, the amide of the carboxylic acid may be employed in place of the ester. Alternatively, when the aldehyde is employed as starting material for the condensation with an o-phenylene diamine, it is necessary to use an oxidising medium for the reaction, good results being obtained using nitrobenzene as solvent. As an example, an o-phenylene diamine and 2-imidazoline-2-aldehyde are heated in nitrobenzene solution for a short time at the reflux temperature. In a modification of this procedure, the aldehyde and diamine are first condensed together to form a Schiff's base which is then cyclised to the benzimidazoic by treatment with an oxidising agent, such as cupric acetate or air, in the presence of a dehydrogenation catalyst.

Since 2-imidazoline carboxylic acids and aldehydes are comparatively difficult to prepare, a preferred course is to start with a benzimidazole which is substituted in the 2-position with a suitable reactive group and condense this with ethylene diamine to give the desired compound, as illustrated in the following equation:

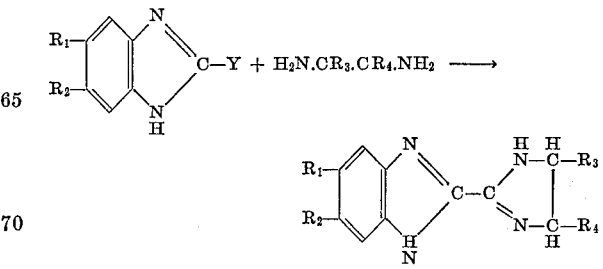

wherein $R_1$, $R_2$, $R_3$, $R_4$ are as denoted above and Y represents a group selected from —COOH; —COOR; —CONH₂; —CN;

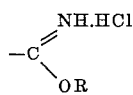

and CCl₃ wherein R signifies alkyl radicals containing not more than five carbon atoms.

We prefer, however, to start with the 2-trichloromethyl benzimidazoles, which react simply with ethylene diamine (or substituted ethylene diamines) to give the required imidazolinyl derivatives in very high yield, as illustrated in the following equation:

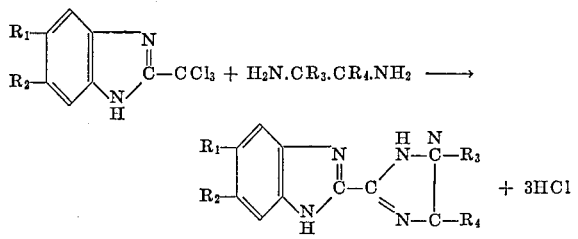

wherein $R_1$, $R_2$, $R_3$ and $R_4$ are as denoted above. Thus, 2-trichloromethyl benzimidazole reacts spontaneously on mixing with an excess of ethylene diamine at room temperature to give 2-(2-imidazolin-2-yl) benzimidazole in quantitative yield. An inert diluent or solvent, such as 1,2-dimethoxyethane or ethyl acetate can be used to give a more easily controlled reaction. The order of mixing of reagents is not critical, which applies also to the molar proportion, however, an excess of the diamine is preferred since this then serves to neutralise the hydrogen chloride formed in the reaction. The product is separated from solvent and the diamine hydrochloride by conventional methods.

Illustrative member compounds embraced by the structural formula above, defining the compounds of the invention, are 2-(2'-imidazolin-2'-yl)-benzimidazole; 2-(2'-imidazolin - 2'-yl)-5,6-dimethylbenzimidazole; 2-(2'-imidazolin-2'-yl)-5,6-dichlorobenzimidazole; 2-(2'-imidazolin - 2'-yl)-5-chlorobenzimidazole; 2-(4'-methyl-2'-imidazolin-2'-yl)-3-methylbenzimidazole; 2-(2'-imidazolin - 2'-yl) - 5-nitrobenzimidazole; and 2-(2'-imidazolin-2'-yl)-5-methylbenzimidazole.

Preparation of the new compounds of the invention is illustrated in the following non-limitative practical examples.

EXAMPLE 1

Ethylene diamine (9 ml., 0.15 mole) was added gradually with cooling to a solution of 2-trichloromethylbenzimidazole (4.8 g., 0.02 mole) in 1,2-dimethoxyethane. After 15 minutes, the solution was diluted with water giving 2-(2'-imidazolin-2'-yl)-benzimidazole as a pale buff solid (93% yield). Recrystallisation from aqueous acetone gave colourless needles, M.P. 280° C.

Analysis of the product $C_{10}H_{10}N_4$ resulted. Found: C, 64.7; H, 5.6; N, 29.7. Requires: C, 64.5; H, 5.4; N, 30.1%. The N-acetyl derivative of the specified compound had a melting point of 211° C.

EXAMPLE 2

1,2-propanediamine (4.2 g., 0.05 mole) was added gradually to a hot solution of 2-trichloromethylbenzimidazole (4.8 g., 0.02 mole) in 1,2-dimethoxyethane (50 ml.). An exothermic reaction developed and the reaction mixture boiled. The mixture was allowed to cool to room temperature over one hour, then solids were filtered off. The solid consisted of propylene diamine hydrochloride together with some of the required product (0.8 g.), which was separated from the hydrochloride by washing with water. Dilution of the reaction mother liquor with petroleum ether gave a further amount (1.2 g.) of the required product. The combined product was recrystallised from chloroform and from ethyl acetate giving 2-(4'-methyl - 2'-imidazolin-2'-yl)-benzimidazole as colourless crystals, M.P. 252° C.

EXAMPLE 3

Ethylene diamine (0.6 g., 0.01 mole) was added gradually to a hot solution of 5(6)-chloro-2-trichloromethylbenzimidazole (1.4 g., 0.005 mole) in alcohol. The mixture was allowed to stand for a few hours after the addition was completed. The precipitated ethylene diamine hydrochloride was filtered off, the alcoholic solution was diluted with water to give some unclean product. Addition of 10% sodium carbonate solution precipitated 2-(2'-imidazolin-2'-yl)-5(6)-chlorobenzimidazole as white crystals (50% yield). Recrystallisation from acetonitrile gave colourless needles, M.P. 245° C.

Analysis of the product $C_{10}H_9N_4Cl$ resulted. Found: C, 54.0; H, 4.1; N, 25.3. Requires: C, 54.4; H, 4.1; N, 25.4%.

EXAMPLE 4

Ethylene diamine (4.5 g.) was added slowly to a cooled solution of 5-methyl-2-trichloromethylbenzimidazole (7.5 g.) in chloroform (150 ml.). Next day the precipitate of ethylene diamine hydrochloride was removed and petroleum ether was then added to precipitate 2-(2'-imidazolin-2'-yl)-5-methylbenzimidazole in 80% yield. After recrystallisation from benzene the solid had M.P. 240° C.

Found $C_{11}H_{12}N_4$: C, 66.3; H, 6.1; N, 28.1. Requires: C, 66.0; H, 6.0; N, 28.0%.

EXAMPLE 5

5-nitro-2-trichloromethylbenzimidazole (14 g.) was added to a solution of ethylene diamine (20 g.) in water (250 ml.). Next day, the solid precipitate was filtered off and recrystallised from butanol. The 2-(2'-imidazolin-2'-yl)-5-nitrobenzimidazole (80% yield) had M. P. 325° C.

Found $C_{10}H_9N_5O_2$: C, 51.7; H, 4.2; N, 29.8. Requires: C, 51.9; H, 3.9; N, 30.3%.

The new compounds of the invention are useful in combatting helminthiasis, i.e. in treating animals susceptible to or suffering from an infestation of the gastrointestinal tract with parasitic worms, by administering to the animals a prophylactic or a therapeutic amount of at least one such compound. Said compounds combine a high degree of activity towards the parasites with a low toxicity toward the host, and, moreover, are relatively economical to manufacture. The anthelmintic activity of said compounds was assessed by the modified McMaster egg counting technique as described by H. B. Whitlock and H. McL. Gordon; J. Council Scientific Industrial Research (Australia) 12; p. 50, 1939 and H. B. Whitlock, J. Council Scientific Industrial Research (Australia) 21; p. 177, 1948. Thus, lambs 4–5 months old were infested with larvae of *Haemonchus contortus*. The faeces of the lambs infected were examined at intervals for eggs of *Haemonchus contortus* to ensure that the infestation had been effective. The lambs were then dosed with the test compounds at rates of 100 mg./kg. of body weight and 50 mg./kg. of body weight, two lambs being included in each treatment group. Anthelmintic efficiency was assessed by determining the number of eggs per gram in faeces passed on each of the seven days following treatment. A 100% reduction in egg count was found at both rates specified, indicating a high anthelmintic efficiency.

Veterinary anthelmintic formulations embodying the new compounds of the invention for treatment of helminthiasis can be either as a liquid suspension ready to use or, as a wettable or water-dispersible powder which is mixed with water prior to use. A liquid-suspension formulation may contain from 50–55% w./v. of the active compound together with a dispersing agent and stabilizing agent. A typical formulation is as follows:

Active compound _____ 50-55 parts weight.
Dispersing agent _____ ½-2 parts weight.
Stabilising agent _____ 1-3 parts weight.
Preservative _____ As required
Water _____ Sufficient to make 100 volumes.

Suitable dispersing agents are those containing sulphonate groups, for example, sodium lignin sulphonate or the sulphonated phenol or naphthol formaldehyde polymers. Bentonine may be employed as the stabilising agent, although it is possible to use such protective colloids as carboxy methyl cellulose, sodium alginate and the like. The formulations can be prepared by mixing the active compound/s and water containing dissolved dispersing agents very vigorously by means of suitable mechanical mixing equipment. A wettable or water-dispersable powder formulation may contain about 90-95% w./w. of the active compound together with a wetting agent and dispersing agent. A diluent such a kaolin can also be added if a concentration below about 98% w./w. is required. An anti-foaming agent, and, in some cases, a stabilising agent may be present. A typical formulation is as follows:

Active compound _____ 90-95 parts weight.
Wetting agent _____ ½-4 parts weight.
Stabilising agent _____ 0-2 parts weight.
Anti-foaming agent _____ 0.01-1 parts weight.
Water _____ 0-5 parts weight.

Suitable wetting agents are the non-ionic alkylphenol-ethylene oxide adducts, such as an octylphenol or nonyl-phenol condensed with ten moles of ethylene oxide, or anionic materials such as the synthetic arly alkyl sulphonates, examples of which are sodium dodecyl benzene sulphonates, or sodium dibutyl napthalene sulphonate. In general about 1% w./w. wetting agent is required. The anti-foaming agent employed may be either a silicone or such materials as ethyl hexanol, octanol and the like; and the stabilising agent may again be chosen from bentonite or the water-soluable gums. Wettable or water-dispersible powder formulations are prepared by careful and adequate mixing of the active compound with other ingredients with or without the addition of some water using typical powder blending equipment such as ribbon blender. The powder is stirred into water by the user before application in the field.

The salts and N-acyl derivatives of the 2-imidazolin-2-yl-benzimidazoles of the invention may be prepared from the indicated bases themselves by conventional procedure, as will be understood by persons skilled in the art. Although the invention has been described with respect to specific modifications, it is not intended that the details thereof shall be construed as limitations on the scope of the invention.

What is claimed is:
1. A veterinary anthelmintic composition comprising a water-dispersable powder formulation containing an anthelmintically effective amount of a 2-imidazolin-2-yl-benzimidazole having the structure:

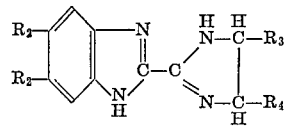

wherein $R_1$ and $R_2$ are each selected from the class consisting of hydrogen, chlorine, bromine, alkyl of not more than 5 carbon atoms, alkoxy of not more than 5 carbon atoms, and wherein $R_3$ and $R_4$ are each selected from the class consisting of hydrogen and alkyl of not more than 5 carbon atoms.

2. A method of combatting helminthiasis in an animal which comprises administering to an animal suffering therefrom, an anthelmantically effective amount of a 2-imidazolin of the structure:

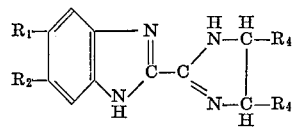

wherein $R_1$ and $R_2$ are each selected from the class consisting of hydrogen, chlorine, bromine, alkyl of not more than 5 carbon atoms, alkoxy of not more than 5 carbon atoms, and wherein $R_3$ and $R_4$ are each selected from the class consisting of hydrogen and alkyl of not more than 5 carbon atoms.

References Cited

UNITED STATES PATENTS

| | | | |
|---|---|---|---|
| 3,166,563 | 1/1965 | Epstein et al. | 260—304 |
| 3,050,526 | 8/1962 | Chien-Pen Lo | 260—304 |
| 3,000,784 | 9/1961 | Todd | 167—53 |
| 3,006,810 | 10/1961 | Shinn et al. | 167—53 |
| 3,102,074 | 8/1963 | Brown | 167—53 |
| 3,137,578 | 6/1964 | Selms | 260—309.2 |

ALBERT T. MEYERS, Primary Examiner

J. V. COSTIGAN, Assistant Examiner